Nov. 29, 1927.　　　　　　　　　　　　　　　　　1,650,615
C. W. DWORACK
TARGET GLIDER RELEASE MECHANISM
Filed Sept. 12, 1923　　　　2 Sheets-Sheet 1
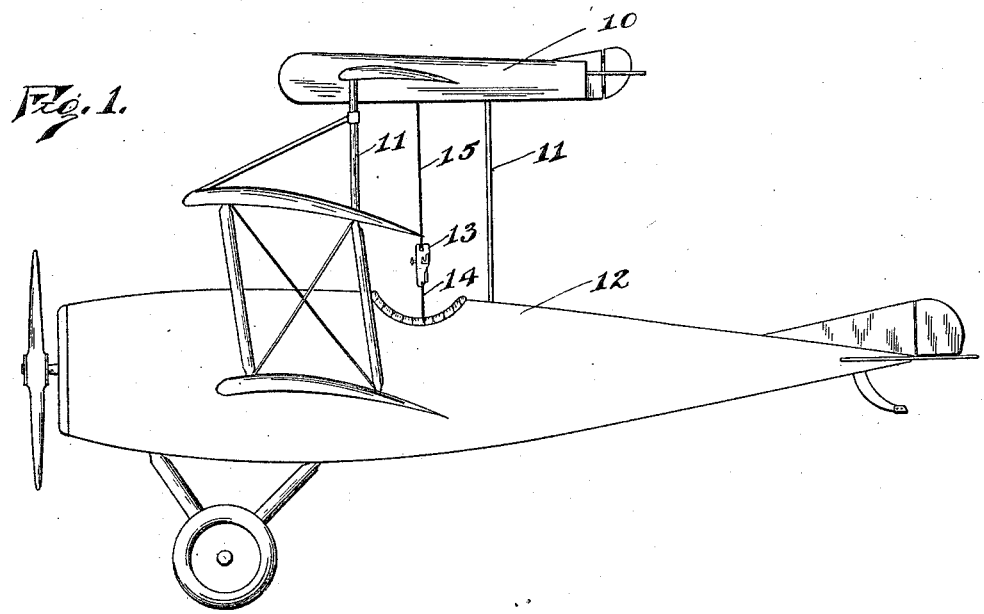
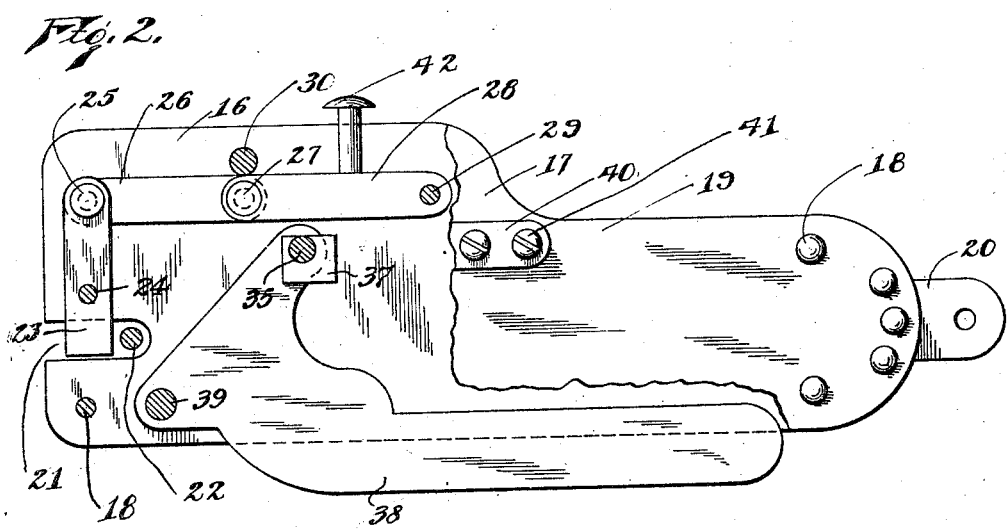
INVENTOR
C. W. Dworack
BY
ATTORNEY Nov. 29, 1927. 1,650,615
C. W. DWORACK
TARGET GLIDER RELEASE MECHANISM
Filed Sept. 12, 1923 2 Sheets-Sheet 2
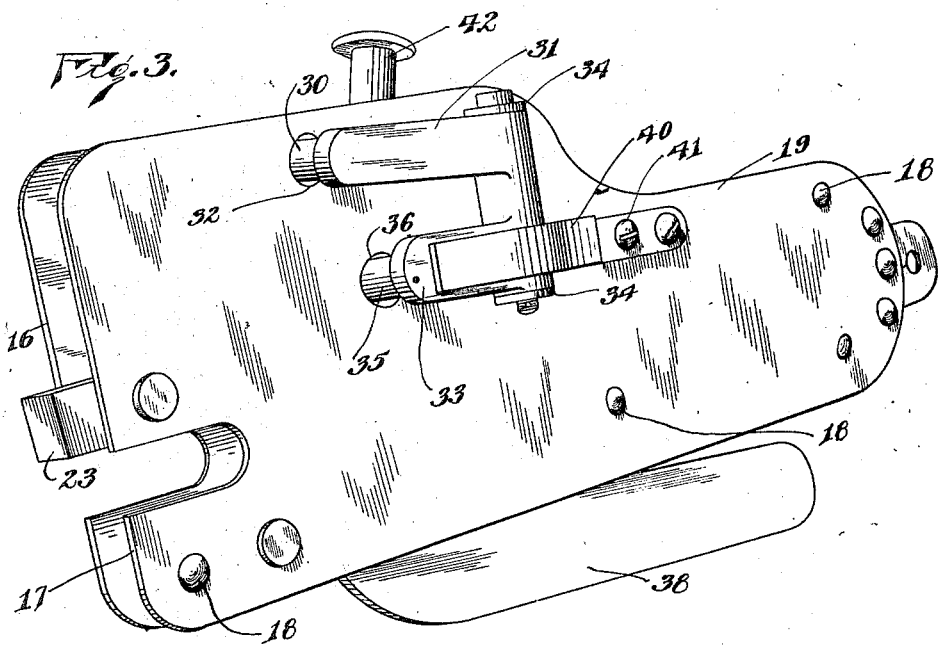
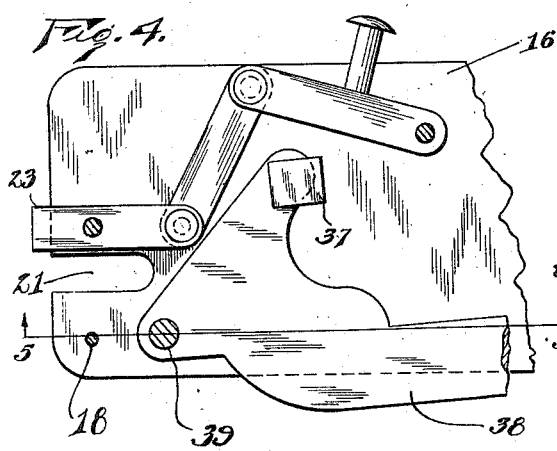
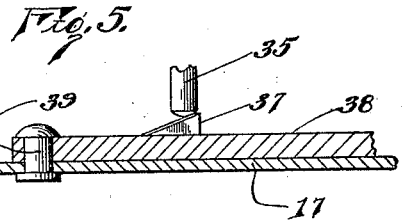
INVENTOR
C. W. Dworack
BY Robert H. Young
ATTORNEY Patented Nov. 29, 1927.

1,650,615

UNITED STATES PATENT OFFICE.

CHARLES W. DWORACK, OF DAYTON, OHIO.

TARGET-GLIDER RELEASE MECHANISM.

Application filed September 12, 1923. Serial No. 662,276.

This invention relates to a release mechanism for releasably interconnecting two or more objects, such as a target glider or the like, and an airplane.

The object of the invention generally stated is to provide a simple and compact release device for this purpose which can be operated instantly by slight hand pressure while holding the same preparatory to releasing the one object from the other.

The invention is described in detail in the following specification in which reference is made to the accompanying drawings, in which:

Fig. 1 is a side view of an airplane and glider, showing the release device of the present invention in operative position, Fig. 2 is a side view of the device, a portion of the same being broken away to disclose parts in the interior thereof, the said parts being in cocked position, Fig. 3 is a perspective view of the device in released condition, Fig. 4 is a fragmentary view similar to Fig. 2, showing the parts of the device in their released positions, and Fig. 5 is a fragmentary sectional detail taken on the line 5—5 of Fig. 4 looking in the direction indicated by the arrows.

Throughout the views, the same reference numerals apply to the same parts.

Referring to the drawing, a target glider 10 is shown suitably supported on struts 11 on top of an airplane 12 and is secured so it may be released from the airplane while in flight, by means of the release device 13. This device, as shown, has connection through a cable or wire 14 with the air plane and has a releasable connection through another wire 15 with the glider. The release of the glider is accomplished when the airplane is in flight, the glider being adapted to sail free of the plane in an obvious manner. The present invention is not concerned with the arrangement described, but merely with the release device.

The release device proper comprises a frame of side plates 16 and 17 joined together in spaced parallel relation by means of rivets 18. The frame is generally rectangular in form, but has a narrow elongated handle end 19. This latter end carries a clevis 20 onto which is fastened the wire 14 to secure the device to the airplane. The opposite end of the frame has a notch 21 in which a spool 22 or the like on the end of the wire 15 is arranged to be confined and releasably held by a latch 23.

The latch 23 is pivoted to the frame at 24 and has pivotal connection at 25 with a toggle link 26. This link is in turn pivotally connected at 27 with another toggle link 28, pivoted in the frame at 29. The links 26 and 28 when coextensive, as shown in Fig. 2, hold the latch 23 crosswise of the notch to confine the spool 22 and are normally held in that position or prevented from moving from it by means of a stop 30. The stop 30 is in the form of a short stud projecting from the free end of a rocker arm 31 through an opening 32 in the plate 17 to lie alongside and in the way of the links 26 and 28 so that they cannot snap over aligned relation to permit the latch 23 to release the spool 22. The rocker arm 31 is integral and parallel with another arm 33 and pivoted between lugs 34 projecting from the outside of the plate 17. The arm 33 has a stud 35 on its free end arranged to operate through an opening 36 in the plate 17 to engage the surface of a cam block 37 on the inner end of a bellcrank lever 38 pivoted in the frame at 39. The stud 35 is normally urged inwardly, as is also the stop stud 30, by means of a leaf spring 40 bearing against the arm 33 and suitably fastened by screws 41 to the outside of the frame.

The free end of the lever 38, in the cocked position of the parts, projects somewhat from the side of the handle end 19 of the frame and so may be operated by one's simply tightly closing his grasp on the frame. In the movement inwardly of the lever which is thereby produced, the cam 37 is moved relatively to the stud 35 and forces the same outwardly and with it the stop stud 30, so that the inner end of the latter is moved clear of the toggle links 26 and 28. At the end of its inward movement, the inner end of the lever 38 engages the toggle links at their pivot 27 and moves the latter from dead center alignment with the pivots 25 and 29. The links snap over dead center alignment and the latch 23 is opened. The wire 15 is obviously under tension constantly while the airplane is in flight because the glider tends to rise free of the plane, so that practically the moment the release device is operated the glider sails free.

The cocking of the device is of course accomplished before taking off and in this operation the key 42, rigid with the link 28 is of utility in moving the links into alined position. The lever 38 is depressed in cocking the device in order to retract the stop 30 and permit the movement of the links 26 and 28 to alined position.

I claim:

1. In a release mechanism for releasably interconnecting two or more objects, a frame having a hand-grip portion thereon, means in said frame for releasably holding an object, auxiliary means for locking said releasably holding means, and means projecting in cocked position from the side of said frame arranged to move the auxiliary locking means to a retracted release position by tightening the grasp when said frame is held in the hand whereby to operate said releasable holding means.

2. In a release mechanism for releasably interconnecting two or more objects, a frame having an elongated handle portion, releasable holding means in said frame, and a release lever pivoted in said frame having the side of the free movable end thereof projecting normally from the side of the said handle portion to be moved inside said handle to release said holding means by merely tightening the grasp when said frame is gripped by the handle portion thereof.

3. A release mechanism comprising a hand-grip frame having means at one end to secure the same to one of two or more objects to be releasably connected and having a recess at the other end to receive means to releasably secure said frame to another object, a latch pivoted in said frame arranged to close said recess, a stop normally holding said latch in closed position, and a release lever pivoted in said frame to retract said stop, said lever having its free movable end projecting from said frame to lie in the hand, and to be thereby operated when said frame is gripped.

4. A release mechanism comprising a frame having means for securing the same permanently to one of two or more objects to be releasably connected and a recess wherein to receive means to releasably connect said frame with another object, a latch pivoted in said frame to close said recess against the escape of said means, a pair of toggle links pivotally connected at one end to said latch and pivoted at the other end in said frame for holding said latch in locked position, a stop normally preventing the release of said toggle, and a release lever pivoted in said frame for retracting said stop to release said latch.

5. A release mechanism comprising a frame having means for securing the same permanently to one of two or more objects to be releasably connected and a recess to receive means to releasably connect said frame with another object, a latch pivoted in said frame to close said recess, a pair of toggle links pivotally connected at one end to said latch and pivoted at the other end in said frame to hold said latch in closed position when said toggle is straight, a stop normally preventing collapsing of said toggle, a release lever pivoted in said frame for retracting said stop, and a button on one of said toggle links for manually moving the toggle to straight position.

6. In a release mechanism for releasably interconnecting two or more objects, a frame, having a recess therein, a latch enclosing said recess when in operative position, snap over elements directly connected with said latch normally under tension to release said latch, means automatically movable into operative position and in contact with said snap over elements for retaining said snap over elements in dead center alignment to hold said latch and means for moving said retaining means out of contact with said snap over elements to permit the snap over elements to move past a dead center alignment and thereby release said latch.

7. In a device of the character described, the combination of a frame having means for permanent connection to one of two or more objects to be releasably connected and having means for quickly releasable connection with another object, said means comprising a latch, snap over elements arranged normally in dead center alignment directly connected to said latch, said elements being normally under tension to release said latch by snapping over dead center, a pin in contact with said elements to retain said elements in dead center alignment and means to move said pin out of contact with said elements to allow said elements to move past dead center alignment to snap over and release said latch.

In testimony whereof I affix my signature.

CHARLES W. DWORACK.